May 27, 1952     D. H. HODGES     2,598,378
FISHING BOBBER
Filed July 31, 1947
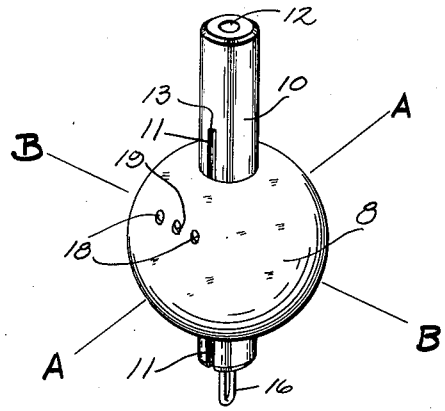
Fig. 1
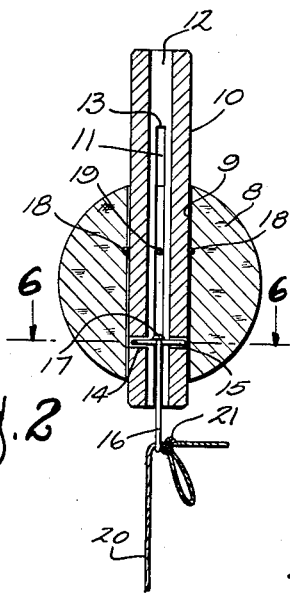
Fig. 2
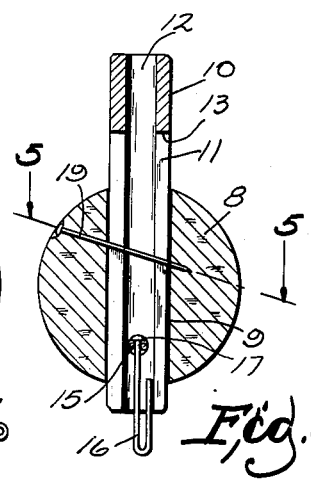
Fig. 3    Fig. 4
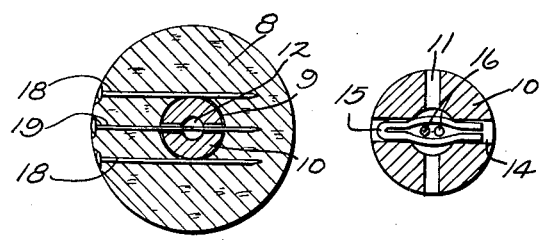
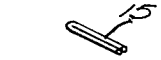
Fig. 5    Fig. 6    Fig. 7
INVENTOR.
DENSON H. HODGES
BY
Wheeler, Wheeler & Wheeler
ATTORNEYS Patented May 27, 1952

2,598,378

UNITED STATES PATENT OFFICE 2,598,378

FISHING BOBBER

Denson H. Hodges, Chicago, Ill.

Application July 31, 1947, Serial No. 764,955

4 Claims. (Cl. 43—44.92)

This invention relates to improvements in fishing bobbers.

The primary object of the invention is to provide a fishing bobber quickly detachable from, and freely adjustable along the fishing line. This is particularly useful when casting and reeling in the line and where a conventional bobber would impede such a process.

Another object of the invention is to combine with the adjustable and detachable features, a float adapted for use either in still fishing or in casting, particularly where it is desired to cast the bait and the float to some remote position where the line may pass freely and without material friction through guide means to any desired depth.

In this connection it is an object of the invention to provide a simple manually adjustable means for frictionally positioning the float along the stem, regardless of any water swelling of the parts which may occur. The travel of the float along the stem is also restrained within defined limits, through a pin-in-slot arrangement.

In result a bobber is provided adjustable along a fishing line and detachable therefrom.

Other objects will be apparent to those skilled in the art upon examination of the following disclosure:

In the drawings:

Figure 1 is a perspective view of the bobber with reference planes AA and BB indicated.

Figure 2 is a cross sectional view of the bobber in the vertical plane BB.

Figure 3 shows in side elevation the bobber viewed in the vertical plane AA.

Figure 4 is a cross sectional view of the bobber in the vertical plane AA.

Figure 5 is a cross sectional view taken along the line 5—5 of Figure 4.

Figure 6 is an enlarged cross sectional view taken along the line 6—6 of Figure 2 with the float removed.

Figure 7 shows the suspension hanger prior to its insertion in operating positions.

Like parts are identified by the same reference characters in the several views.

A buoyant float 8, of cork or like material which may be spherical or of any other convenient design, is axially bored at 9 to receive a tubular stem 10, of wood or like material.

The stem is provided with a longitudinal slot 11, and a bore 12. The bore 12 may extend the entire length of the stem, but the slot 11 is terminated at 13 near the upper end of the stem. Near its lower end the stem is drilled transverse to the slot to provide a socket 14 in which a hanger 15, as best shown in Figure 6, may be positioned. Prior to its seating within its socket the hanger 15 consists of a U-shaped pin as shown in Figure 7. After insertion in its socket 14 the parallel members of the hanger may be laterally distended or bent intermediate the ends of the hanger, as with a punch, a distance greater than the diameter of the socket 14, thus locking the hanger in place, and providing an opening through which the line guide 16 may be admitted.

Suspended from the hanger 15 by its head 17 is a hook shaped line guide 16. The guide may be swung outwardly in the plane of the slot, as shown in Figure 3, so as to permit a fishing line 20 to be looped into place and then the guide may be returned to its normally depending position as shown in Figures 2 and 4. The swivel suspension of the line guide permits the guide to rotate about its axis and thus prevent snarling of the line.

The float 8 is normally positioned at the lower extremity of the stem so as to lock the line guide 16 within the slot 11. The float is adjustable along the stem and may be slid to its uppermost position, as shown in Figure 3, to permit swinging the line guide 16 to an accessible position for attaching or detaching the line.

The bore 9 of the float is of slightly larger diameter than the stem 10. In order to provide adjustable frictional contacts between the float and the stem, pins 18 are thrust through the float, making frictional contact with the circumference of the stem as shown in Figure 5. Should the stem or the float become deformed through water soakage, the desired pressure between the float and the stem may be obtained by a manual shifting of the pins. The travel of the float on the stem is controlled by pin 19 riding in slot 11 and limited in its lower position by contact with the hanger 15 and in its upper position by contact with the top of the slot 13.

In operation the float is moved to its uppermost position, the line guide swung out and the line looped therein, the line guide swung back to its normally depending position and the float slid down so as to lock the line guide in place. The bait, sinker and bobber may then be cast in one relatively compact assembly to any desired water point. The bobber will remain on the surface and the weight of the sinker will draw the line 20 through the guide until stopped at any predetermined depth by engagement of the guide with the line knot 21, as shown in Figure 2. The line guide may be manually crimped to accommodate any size line and knot. When reeling in, the line will slip through the guide until contact with the sinker is made; the bobber, sinker and bait hook will then return to the fisherman in one assembly. The bobber may then be detached from the line by going through the reverse of the aforementioned procedure.

I claim:

1. The combination, in a fishing bobber, of a float, a stem relatively adjustable therein and provided with a slot running out at one end of the stem, and a pin extending into the float and through the stem slot, the stem being provided with a cross pin with which said first pin engages at one limit of relative adjustment of the float with respect to the stem.

2. In a fishing bobber, the combination with a slotted stem of a line guide suspended within and extending from the lower extremity of said stem and provided with a line loop, a support member in the stem spanning the slot and supporting the line guide for swinging movement outwardly of the stem in the plane of the slot to expose said line loop, and a float axially reciprocable on the stem to and from a position encompassing said line guide, whereby to restrain it from swinging outwardly of said stem.

3. The device of claim 2 in further combination with at least one pin extending into the float beside the stem and in frictional contact therewith to hold the float in adjustable frictional contact with the stem.

4. In a device of the character described, the combination with a headed line guide and a transverse hanger comprising a bifurcated pin having its legs provided with bent portions to define an aperture shaped to receive in swiveled suspension the head of the line guide, of a suspending member having a slot opening outwardly at either side of such member and a socket disposed within said member transversely of the slot, said line guide being normally supported within the slot and the hanger being seated in the socket and spanning the slot, the bent portions of said hanger legs extending outwardly intermediate the ends of said legs a distance greater than the diameter of the socket whereby to lock the hanger within the socket.

DENSON H. HODGES.

REFERENCES CITED

The following references are of record in the file of this patent:

UNITED STATES PATENTS

| Number | Name | Date |
|---|---|---|
| 56,857 | Martin | July 31, 1866 |
| 755,683 | Miller | Mar. 29, 1904 |
| 928,439 | Garrard | July 20, 1909 |
| 1,652,858 | Hahn | Dec. 13, 1927 |
| 2,302,549 | Hodges | Nov. 17, 1942 |
| 2,494,620 | Johnson | Jan. 17, 1950 |
| 2,539,234 | Dobkowski | Jan. 23, 1951 |

FOREIGN PATENTS

| Number | Country | Date |
|---|---|---|
| 25,511 | Great Britain | of 1911 |